UNITED STATES PATENT OFFICE.

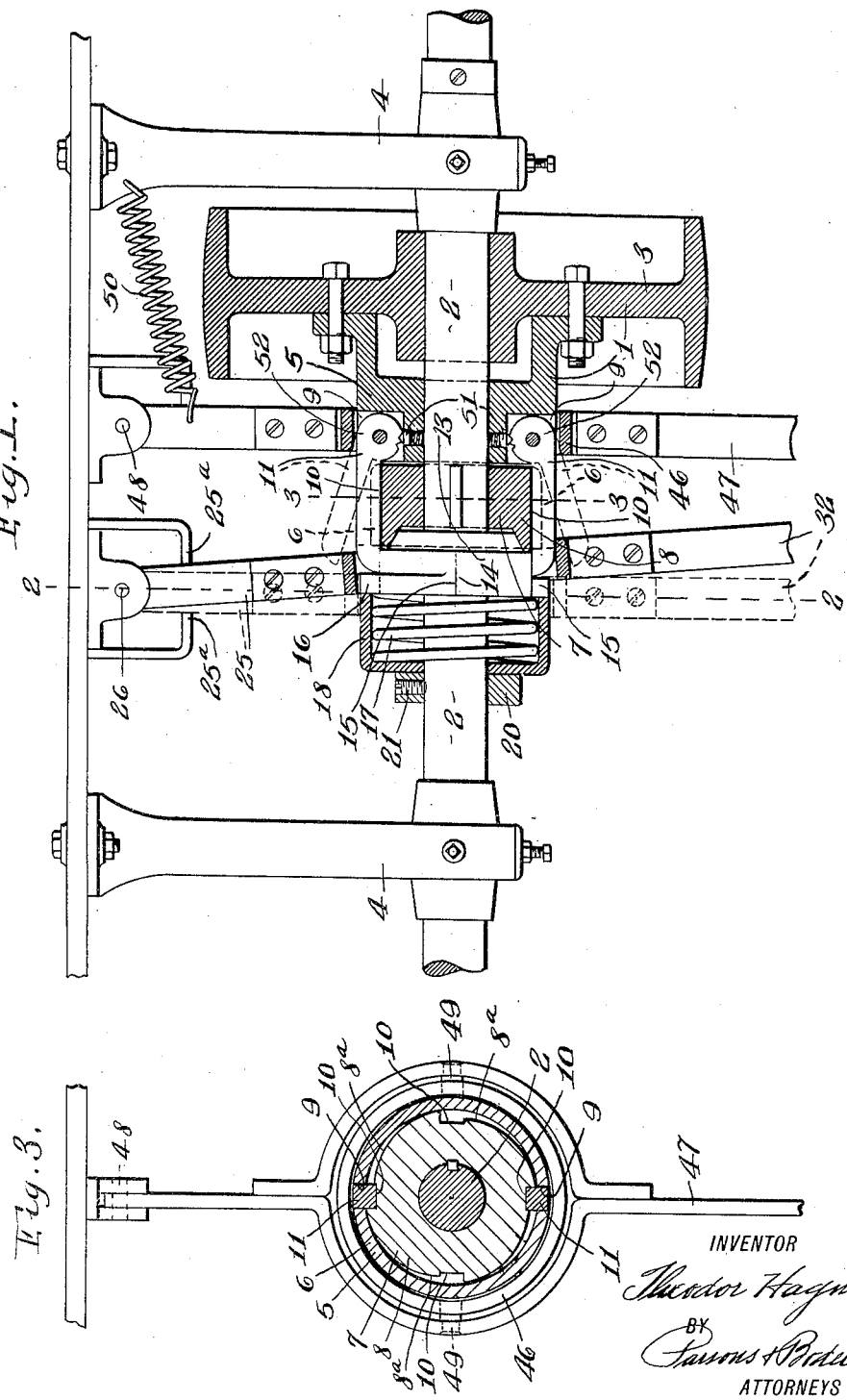

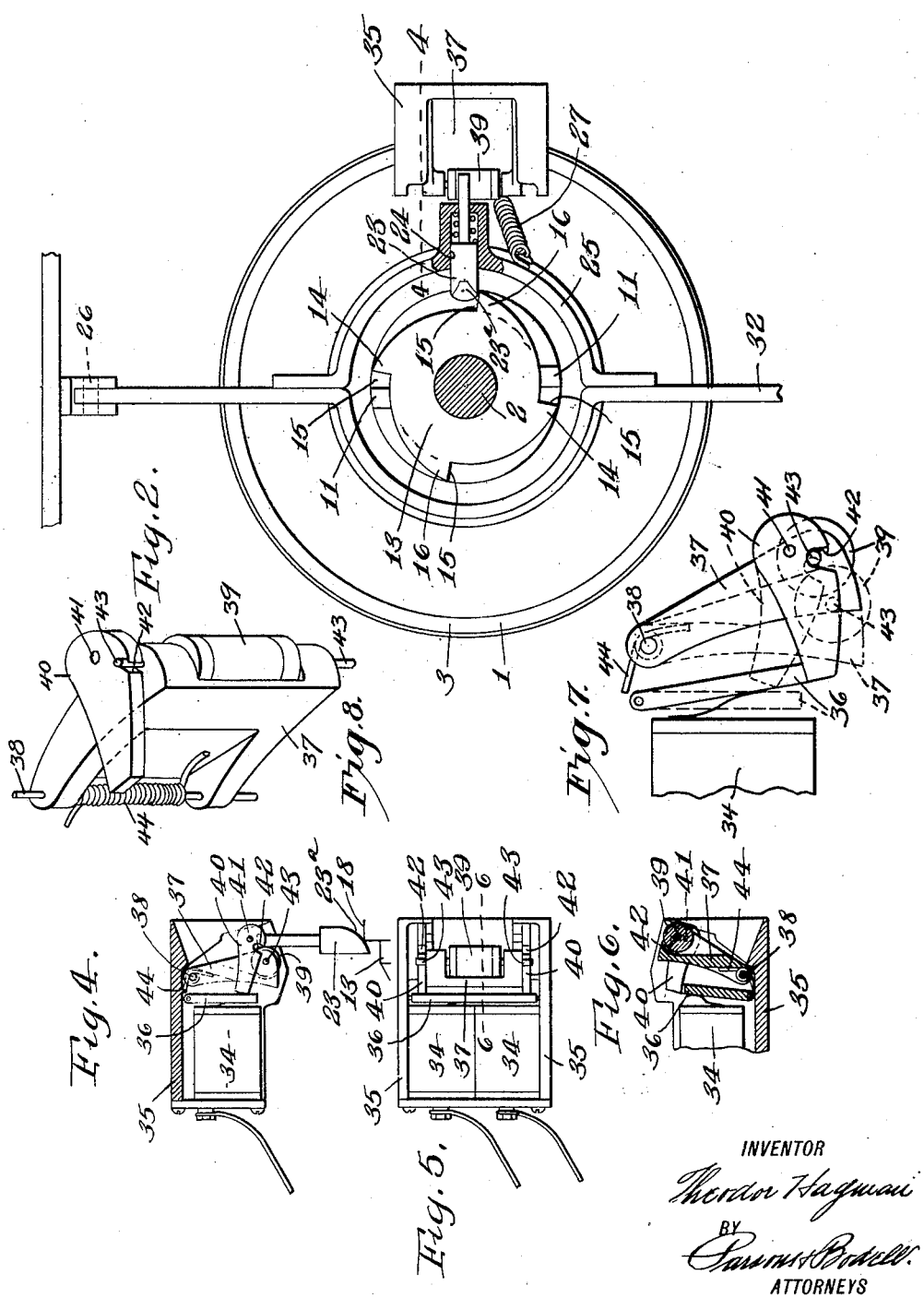

THEODOR HAGMAN, OF SYRACUSE, NEW YORK.

SAFETY-CLUTCH.

1,321,626.  Specification of Letters Patent.  Patented Nov. 11, 1919.

Application filed July 23, 1917. Serial No. 182,173.

*To all whom it may concern:*

Be it known that I, THEODOR HAGMAN, a citizen of the United States, and a resident of Syracuse, in the county of Onondaga and State of New York, have invented a certain new and useful Safety-Clutch, of which the following is a specification.

This invention relates to safety clutches of the type shown in my Patent No. 964,774, July 19, 1910, and has for its object a particularly simple and efficient mechanism for operating the clutch at will to unclutch the same, and for resetting the clutch and its operating mechanism; and the invention consists in the combinations and constructions hereinafter set forth and claimed.

In describing this invention, reference is had to the accompanying drawings in which like characters designate corresponding parts in all the views.

Figure 1 is a longitudinal sectional view, partly in elevation, of my safety clutch and portions of the resetting means.

Figs. 2 and 3 are sectional views respectively on lines 2—2, 3—3, Fig. 1.

Fig. 4 is a fragmentary detail view taken on line 4—4, Fig. 2.

Fig. 5 is an elevation looking upwardly in Fig 4, parts being omitted.

Fig. 6 is a sectional view on the plane of line 6—6, Fig. 5.

Figs. 7 and 8 are respectively a plan and isometric view of parts seen in Figs. 4, 5 and 6, parts being omitted in Fig. 8.

This invention comprises generally driving and driven elements, a safety clutch coupling said elements together, mechanism whereby said elements may be uncoupled at will by the rotative movement of said elements, manual means for resetting the clutch, and manual means for resetting said mechanism.

1 and 2 are respectively driving and driven elements arranged in axial alinement, these elements and the clutch construction being substantially the same as that shown in my patent referred to. The driving element comprises a pulley 3 mounted on the driven element 2, here shown as a shaft supported in suitable hangers 4. The clutch comprises driving and driven sections associated respectively with the driving and driven elements and shiftable members connecting the sections. 5 is a driving section loosely mounted on the shaft 2 and bolted to the pulley 3, the section 5 being formed with an axial socket at one end which provides a sleeve 6. 7 is the driven section which includes an enlargement or collar 8 fixed on the shaft 2 and located within the sleeve 6. The section 5 and its sleeve 6, and the section 7 are provided with lengthwise radially alined keyways 9 and 10, portions of the keyways 9 in the sleeve 6 extending through the sleeve.

11 are the members connecting the clutch sections and are here shown as keys pivoted in the keyways 9 in the driving clutch section 5 and having portions movable into the keyways or slots 9 of the sleeve 6 and into the alined keyways 10 of the collar 8 on the shaft 2, within the sleeve, the ends of the keys 11 projecting beyond the ends of the sleeve 6 and collar 7. The clutch as here shown, is provided with two keys 11.

The keys 11 are normally in the position shown in full lines in Fig. 1, that is, lying in the keyways 9 and 10, and the means for moving them out of the keyways to uncouple the elements 1, 2 or unclutch the safety clutch, comprises a cam 13 loosely mounted on the shaft 2, and having points or teeth 14 movable against the inner sides of the projecting ends of the keys 11, in order to force the keys outwardly or radially on their pivots out of the keyways 9 and 10. The cam 13 is here shown as provided with two diametrically opposite teeth 14 having rounding or cam surfaces on one side and abrupt shoulders 15 on the other side and with two additional teeth 16 diametrically opposite, but not wide enough to engage the ends of the keys 11, but having the shoulders 15. Said cam 13 is here shown as pressed axially against the collar 8 and the end of the sleeve 6, by a spring 17 coiled about the shaft 2 and located in a discoidal part or casing 18 mounted adjacent the cam 13 and held in position by a collar 20 suitably keyed to the shaft as by a set screw 21. The periphery of the casing is arranged at one side of the path of the shoulders 15 and is of the same or greater radius than said shoulders 15 and forms a rest for the holding member when the holding member is in its idle or inoperative position.

23 designates the holding member which is here shown as a spring pressed plunger movable radially relatively to the shaft 2 in a suitable guide 24 provided in a carrier 25 which is movable in a direction axially of the shaft 2, this carrier 25 being here shown as a lever pivoted at 26 at a point above the shaft 2, and having a bifurcated portion extending around and encircling the casing 18. The carrier is normally arranged so that the holding member 23 rests on the periphery of the casing 18 and is movable lengthwise of the shaft 2 to carry the plunger 23 into position to snap into engagement with one of the abrupt shoulders 15 of the cam 13, and thus retard the movement of the cam so that the continued rotation of the driving and driven elements causes the inclined surfaces of the teeth 14 of the cam to force the keys 11 outwardly. A spring 27 normally tends to move the carrier 25 to move the holding member 23 off the surface of the casing into the path of the shoulders 15 of the cam 13, and thus hold the cam from rotation so that the keys 11 are shifted outwardly to uncouple the clutch.

The carrier 25 is provided with a handle 32 at its lower end by which it can be manually reset. One of the coacting surfaces of the discoidal member 18 and the holding member 23 is inclined to depress or move outwardly radially the holding member 23 during the resetting movement of the carrier. As here shown, the holding member 23 is formed with an inclined or ratchet surface 23$^a$. Upon the resetting movement of the carrier 25, the spring pressed plunger 23 is forced out of engagement with the shoulders 15 of the cam 13 and rests upon the casing 18. Overthrow of the lever 25 beyond its starting position is prevented by a suitable stop 25$^a$.

The holding member 23 is normally in its inoperative position, and the means for controlling the movement of the same into its operative position by the carrier 25 includes an electromagnet and detent mechanism operated by the electromagnet to release the member 23 and its carrier 25 and permit the carrier 25 to be moved by its spring 27, the detent mechanism being normally in operative position and moved out of its operative position by the magnet when energized. The spring 27 is a coiled extension spring which is connected at one end to the carrier 25 and at its other end to any fixed point, the spring being normally under tension so that when the holding member 23 is withdrawn the spring is free to contract and shift the carrier 25.

34 designates the electromagnet supported by a frame 35. 36 is the armature for the magnet. The detent mechanism comprises a member 37 pivoted at 38 to the frame 35 and carrying a roller 39 which acts upon the stem of the holding member 23 and a latch or latches 40 pivoted at 41 to said frame 35 and normally engaged with the member 37 and being held in engagement therewith by the armature 36 when the armature is in its inoperative position as shown in Fig. 6. As here shown, there are two latches 40 coacting with the member 37, the latches 40 have notches 42 which receive shoulders or pins 43 at opposite ends of the member 37 as seen in Fig. 5, and holding the member 37 from movement by the spring 27. Said member 37 is also acted upon by a suitable returning spring 44 which acts to return the member 37 to its normal position during the resetting operation when said member 37 is relieved of the action of the spring 27.

In operation, when the circuit through the magnet is closed, the armature is attracted permitting the latches 40 to be moved into the position shown in Fig. 4, thus moving the notches 42 away from the shoulders 43 so that the spring 27 is free to move the carrier to shift the plunger from its normal position into the path of the teeth 15 of the cam 13.

During the resetting operation, when the lever or carrier 25 is actuated by hand, the spring 44 returns the member 37 to its original position, and during this movement the shoulders 43 press against the latches 40 and return the same on their pivots from the position shown in Fig. 4 into that shown in Fig. 6, whereupon the armature which is spring pressed outwardly, moves into the position shown in Fig. 6, to hold the latches 40 in their operative position. Any other suitable detent mechanism may be substituted for that shown and described.

The means for returning the keys 11 and resetting the clutch, includes a collar 46 encircling the driving section and movable lengthwise thereof over the keys 11 in order to depress the keys 11 radially into the keyways 9, 10 when the keyways 9 and 10 come into radial alinement. This collar 46 is actuated by a suitable lever 47 pivoted at 48 to a point above the shaft 2 and has a bifurcated portion encircling the clutch section 5 and connected thereto by pins 49 at diametrically opposite points. The resetting lever is returned to its normal position by a spring 50.

The keys 11 are yieldingly held in their operative or inoperative positions by spring pressed plungers 51 located at the bottoms of the keyways 9 in the parts 5, and coacting with notches in the hubs 52 of the keys 11. Preferably as seen in Fig. 3 the walls of the keyways 10 are lower on the advance sides of the keyways, with respect to the direction of rotation of the shaft 2 and collar 8, and the surfaces 8$^a$ approaching the lower sides of the keyways are of different curve or centers from the surfaces approaching the high sides of the keyways. Hence the keys can be gradually reset when the collar 47 is operated.

In operation, the circuit which controls the electromagnet 34, is provided with buttons at suitable points as on the hand levers of various machines or in any other convenient locations, and when, as in the case of accident, it is necessary for quick stopping of a machine, any one of the buttons in the circuit can be pressed, thus energizing the magnet 34 which releases the carrier 25 so that it can be operated by its spring 27 to move the holding member 23 into the path of a shoulder 15 of the cam 13 as before described, and effect the uncoupling of the clutch.

When the contingency requiring the quick stopping of machinery ceases to exist, the parts can be quickly reset by operating the handles 32 and 47 of the carrier and of the clutch resetting lever.

This invention is particularly advantageous in that it is readily operable and can be quickly reset.

What I claim is:

1. The combination of rotatable driving and driven elements arranged in axial alinement, a clutch coupling said elements together, means operable by the movement of the driving element for uncoupling the clutch, including a shifting member normally rotatable with said elements, and having a shoulder, a holding member normally arranged at one side of the path of the shoulder, a carrier for said holding member movable in a direction axially of the driving and driven elements for carrying the holding member into the path of the shoulder, and means for controlling the movement of the carrier, substantially as and for the purpose specified.

2. The combination of rotatable driving and driven elements arranged in axial alinement, a clutch coupling said members together, means operable by the movement of the driving element for uncoupling the clutch including a shifting member normally rotatable with said elements and having a shoulder, a discoidal member mounted adjacent the shifting member and having a peripheral annular surface at one side of the path of said shoulder, a holding member normally engaging said surface, a carrier for said member movable in a direction axially of the driving and driven elements for carrying the holding member into the path of the shoulder, and means for controlling the movement of the carrier in one direction, the carrier being manually movable in the opposite direction, substantially as and for the purpose set forth.

3. The combination of rotatable driving and driven elements arranged in axial alinement, a clutch for coupling said elements together, means operable by the movement of the driving element for uncoupling the clutch including a shifting member normally rotatable with said elements and having a shoulder, a discoidal part mounted adjacent the shifting member and having a peripheral annular surface at one side of the path of said shoulder, a holding member normally engaging said surface, a carrier for said member movable in a direction axially of the driving and driven elements for carrying the holding member into the path of the shoulder, and electromagnetic means for controlling the movement of the carrier in one direction, substantially as and for the purpose described.

4. The combination of rotatable driving and driven elements arranged in axial alinement, a clutch for coupling said elements together, means operable by the movement of the driving element for uncoupling the clutch including a shiftable member normally rotatable with said elements and having a shoulder, a discoidal part adjacent the shifting member and having a peripheral annular surface at one side of the path of, and of greater radius than, said shoulder, a holding member normally engaging said surface, a carrier for said member movable in a direction axially of the driving and driven elements for carrying the holding member into the path of the shoulder, and means for controlling the movement of the carrier, substantially as and for the purpose specified.

5. The combination of rotatable driving and driven elements arranged in axial alinement, a clutch for coupling said elements together, means operable by the movement of the driving element for uncoupling the clutch including a shifting member normally rotatable with said elements and having a shoulder, a discoidal part adjacent the shifting member and having a peripheral annular surface at one side of the path of and of greater radius than said shoulder, a holding member normally engaging said surface, a carrier for said member movable in a direction axially of the driving and driven elements for carrying the holding member into the path of the shoulder, one of the coacting surfaces of the holding member and the discoidal part being a cam surface serving to move the holding member radially outwardly out of its holding position during movement of the carrier in a retrograde direction, and means for controlling the movement of the carrier, substantially as and for the purpose set forth.

6. The combination with rotatable driving and driven elements, of a clutch coupling said elements together including driving and driven sections fixed respectively to said elements and a radially movable key carried by the driving section and movable outwardly from its operative position, a cam normally rotatable with said sections and arranged to coact with the key to move the same outwardly, means for holding the cam from movement whereby rotation of the elements causes the cam to move the key outwardly, means operable at will for controlling the movement of the cam holding means, and manual means including a part movable lengthwise of the driving element and arranged to engage the key to reset the same, and manual means for resetting the cam holding means in its normal position, substantially as and for the purpose described.

7. The combination with rotatable driving and driven elements, of a clutch coupling said elements together including driving and driven sections fixed respectively to said elements, and a radially movable key carried by the driving section, and movable outwardly from its operative position, a cam normally rotatable with said sections and arranged to coact with the key to move the same outwardly, means operable at will for holding the cam from movement whereby rotation of the elements and sections causes the cam to move the key outwardly, electromagnetic means operable at will for controlling the movement of the cam holding means into operative position, manual means for resetting the key including a part movable lengthwise of the driving section to engage and move the key, and manual means for moving the cam holding means to its normal position, substantially as and for the purpose specified.

8. The combination with rotatable driving and driven elements arranged in axial alinement, a clutch connecting said elements including driving and driven sections fixed respectively to said elements, the driven clutch section having a portion located within the driving section, and said sections being formed with keyways arranged to come into radial alinement, a key extending lengthwise of the driving element and into the keyways of both of said elements, a cam loosely mounted on the driven element adjacent the end of the driven clutch section, and being normally rotatable therewith, and having a stop shoulder and an inclined surface for engaging the key to force the same outwardly when the cam is held from rotation, a disk mounted on the driven element adjacent the cam and having its periphery of as great a radius as the radius of the cam, a carrier movable in a direction lengthwise of the driven element, a spring pressed holding member supported by the carrier, and movable radially relatively to the driven element and normally engaging the periphery of the disk and movable into the path of the shoulder of the cam, a spring tending to move the carrier in one direction to carry the holding member into the path of the shoulder, the carrier being movable manually in the opposite direction, electromagnetic means for controlling the movement of the carrier, a non-rotatable collar movable lengthwise of the driving clutch section and coacting with the key to move the same radially inwardly and reset the same, and manual means for moving the ring in one direction to reset the key, substantially as and for the purpose set forth.

9. The combination with rotatable driving and driven elements, of a clutch coupling said elements together including driving and driven sections fixed respectively to said elements, and a radially movable key carried by the driving section and movable outwardly from its operative position, means for moving the key outwardly, and means for resetting the key including a collar encircling the driving clutch section and movable lengthwise thereof, substantially as and for the purpose set forth.

In testimony whereof, I have hereunto signed my name, at Syracuse, in the county of Onondaga, and State of New York, this 20th day of July, 1917.

THEODOR HAGMAN.